(12) United States Patent
Hu et al.

(10) Patent No.: US 10,404,473 B1
(45) Date of Patent: Sep. 3, 2019

(54) SYSTEMS AND METHODS FOR PROCESSING TRANSACTION VERIFICATION OPERATIONS IN DECENTRALIZED APPLICATIONS

(71) Applicant: Accelor Ltd., Grand Cayman (KY)

(72) Inventors: Shiwen Hu, Sunnyvale, CA (US); Xiaohan Ma, Santa Clara, CA (US); Guojun Chu, Saratoga, CA (US)

(73) Assignee: Accelor Ltd., Grand Cayman (KY)

( * ) Notice: Subject to any disclaimer, the term of this patent is extended or adjusted under 35 U.S.C. 154(b) by 0 days.

(21) Appl. No.: 16/122,257

(22) Filed: Sep. 5, 2018

(51) Int. Cl.
*H04L 9/32* (2006.01)
*G06F 12/1081* (2016.01)

(52) U.S. Cl.
CPC ........ *H04L 9/3247* (2013.01); *G06F 12/1081* (2013.01); *G06F 2212/621* (2013.01)

(58) Field of Classification Search
CPC . H04L 9/3247; G06F 1/1081; G06F 2212/621
See application file for complete search history.

(56) References Cited

U.S. PATENT DOCUMENTS

| | | | |
|---|---|---|---|
| 3,582,908 A | | 6/1971 | Koo |
| 3,641,516 A | | 2/1972 | Castrucci et al. |
| 6,134,676 A | | 10/2000 | VanHuben |
| 6,138,228 A | * | 10/2000 | Douady ............... G06F 13/4243 712/31 |
| 6,724,394 B1 | | 4/2004 | Zatz |
| 7,599,491 B2 | | 10/2009 | Lambert |
| 7,979,569 B2 | | 7/2011 | Eisner et al. |
| 8,280,048 B2 | | 10/2012 | Lambert |
| 8,621,239 B2 | | 12/2013 | Lambert |

(Continued)

FOREIGN PATENT DOCUMENTS

| | | |
|---|---|---|
| JP | 08-297567 A | 11/1996 |
| WO | 2017/207717 A1 | 12/2017 |

OTHER PUBLICATIONS

Zsolt István et al., Consensus in a Box: Inexpensive Coordination in Hardware, USENIX Association, 13th USENIX Symposium on Networked Systems Design and Implementation (NSDI '16), Mar. 16-18, 2016 (15 pages).

(Continued)

*Primary Examiner* — Catherine Thiaw
(74) *Attorney, Agent, or Firm* — Sheppard Mullin Richter & Hampton LLP

(57) ABSTRACT

Systems and methods related to processing transaction verification operations in decentralized applications via a fixed pipeline hardware architecture are described herein. The fixed pipeline hardware architecture may include and/or support at least a crypto engine and a read set validation engine. The crypto engine may itself comprise a hardware architecture configured to perform cryptographic operations necessary to validate signatures for transactions in decentralized applications. In various implementations, the hardware architecture of a crypto engine may include a scheduler and a series of crypto execution units configured to operate in parallel. The read set validation engine may be configured to verify whether a transaction is valid based on a comparison of an incoming transaction state indicating transaction data for the transaction and a local state related to the transaction.

18 Claims, 4 Drawing Sheets

(56) References Cited

U.S. PATENT DOCUMENTS

| | | | |
|---|---|---|---|
| 8,675,869 B2 | 3/2014 | Little et al. | |
| 8,782,434 B1* | 7/2014 | Ghose | G06F 9/3851 |
| | | | 713/190 |
| 8,972,738 B2 | 3/2015 | Little et al. | |
| 2004/0060032 A1 | 3/2004 | McCubbrey | |
| 2010/0325419 A1* | 12/2010 | Kanekar | H04L 63/0823 |
| | | | 713/151 |
| 2011/0271007 A1 | 11/2011 | Wang et al. | |
| 2015/0332283 A1 | 11/2015 | Witchey | |
| 2016/0070700 A1* | 3/2016 | Biswas | G06F 17/3033 |
| | | | 707/698 |
| 2016/0125040 A1* | 5/2016 | Kheterpal | G06Q 20/3678 |
| | | | 707/776 |
| 2017/0083998 A1 | 3/2017 | Acharya | |
| 2017/0206382 A1* | 7/2017 | Rodriguez De Castro | |
| | | | G06F 21/76 |
| 2017/0212781 A1* | 7/2017 | Dillenberger | G06F 9/5038 |
| 2017/0244720 A1 | 8/2017 | Kurian et al. | |
| 2017/0300978 A1* | 10/2017 | Narasimhan | G06Q 30/0279 |
| 2017/0331896 A1 | 11/2017 | Holloway et al. | |
| 2018/0006808 A1* | 1/2018 | Suresh | H04L 9/0643 |
| 2018/0145836 A1 | 5/2018 | Saur et al. | |
| 2018/0181309 A1 | 6/2018 | Miyamae et al. | |
| 2018/0217942 A1 | 8/2018 | Fons et al. | |
| 2018/0219671 A1 | 8/2018 | Velissarios et al. | |
| 2018/0219685 A1* | 8/2018 | Deery | H04L 9/3247 |
| 2018/0227293 A1* | 8/2018 | Uhr | G06Q 20/36 |
| 2018/0247376 A1 | 8/2018 | Sharma et al. | |
| 2018/0248880 A1 | 8/2018 | Sardesai et al. | |
| 2018/0287915 A1 | 10/2018 | Smith et al. | |
| 2019/0034205 A1* | 1/2019 | Golombek | G06F 9/3802 |
| 2019/0081793 A1* | 3/2019 | Martino | H04L 9/3236 |

OTHER PUBLICATIONS

Xiaoqi Li et al, "A survey on the security of blockchain systems", *Future Generation Computer Systems,* Aug. 23, 2017, 13 pages.

Lian Yu et al, "Smart-Contract Execution with Concurrent Block Building", 2017 *IEEE Symposium on Service-Oriented System Engineering (SOSE),* IEEE, 2017, pp. 160-167.

Non-Final Office Action dated Jan. 25, 2019, issued in related U.S. Appl. No. 16/122,406 (14 pages).

Notice of Allowance dated Feb. 12, 2019, issued in related U.S. Appl. No. 16/160,161 (11 pages).

U.S. Appl. No. 16/188,783, filed Nov. 13, 2018.

U.S. Appl. No. 16/236,243, filed Dec. 28, 2018.

* cited by examiner

SYSTEMS AND METHODS FOR PROCESSING TRANSACTION VERIFICATION OPERATIONS IN DECENTRALIZED APPLICATIONS

FIELD OF THE INVENTION

The invention relates to systems and methods for processing transaction verification operations in decentralized applications via a fixed pipeline hardware architecture.

BACKGROUND OF THE INVENTION

Decentralized applications are applications that run on peer-to-peer networks, rather than on a single computer. Transactions associated with decentralized applications are typically processed by nodes (or computers) on the peer-to-peer network based on trustless protocols or a series of validation rules established by the creators of the decentralized application. A critical component of decentralized applications is the manner in which transactions associated with the decentralized application are verified and recorded.

In many decentralized applications, verified transactions are committed to a blockchain. Many types of blockchains exist. In general, they are distributed ledgers shared by the nodes on a network to which transactions are recorded and validated. A block is a part of a blockchain, which records some or all of the recent transactions. Once completed, a block is stored in the blockchain as a permanent database. Each time a block gets completed, a new one is generated. Each block in the blockchain is connected to the others (like links in a chain) in proper linear, chronological order. Every block contains a hash of the previous block. The blockchain has information about different user addresses and their balances right from the genesis block to the most recently completed block.

Recent advances in decentralized applications have enabled high-throughput transaction processing speed. Conventionally, increased throughput transaction processing speed has been achieved via software stack development and/or protocol consolidation. However, many of the operations required to verify transactions are computationally intensive. As a result, users in decentralized applications may be incentivized to skip verification operations to preserve computational resources and apply them in a manner that may benefit them financially, but also create security concerns and limit the scalability of the decentralized application. This is sometimes referred to as the "verifier's dilemma." It would be desirable to provide systems and methods that encompass a hardware solution to the verifier's dilemma by facilitating increased throughput transaction processing speed in decentralized application via a fixed pipeline hardware architecture.

SUMMARY OF THE INVENTION

The systems and methods described herein relate to a fixed pipeline hardware architecture configured to process transaction verification operations for decentralized applications. The fixed pipeline hardware architecture may comprise and/or be incorporated within a self-contained hardware device comprising electronic circuitry configured to be communicatively coupled or physically attached to a component of a computer system. The fixed pipeline hardware architecture may include and/or support at least a high-speed direct memory access (DMA) configured to access a ledger stored in local memory, a crypto engine, a read set validation engine, and/or one or more other components, engines, or modules configured to accelerate the transaction verification process. In some implementations, the fixed pipeline architecture may include multiple crypto engines and/or multiple read set validation engines based on performance, cost, or power tradeoffs.

The crypto engine may itself comprise a hardware architecture configured to perform cryptographic operations necessary to validate signatures for transactions in decentralized applications. For example, the one or more cryptographic operations may comprise crypto signature generation (encrypt) operations and crypto signature verification (decrypt) operations. In various implementations, the hardware architecture of a crypto engine may include a scheduler and a series of crypto execution units configured to operate in parallel. Each of the crypto execution units may be configured to perform one of more specific cryptographic operations or types of cryptographic operations independently. Because each of the crypto execution units may be associated with one or more cryptographic operations, the crypto execution units may be configurable for different decentralized applications. The scheduler may be configured to identify the cryptographic operations required to authenticate one or more cryptographic signatures and dispatch tasks related to the signatures among the series of crypto execution units.

The read set validation engine may be configured to verify whether a transaction is valid based on a comparison of an incoming transaction state indicating transaction data for the transaction and a local state related to the transaction. The incoming transaction state may be determined based on the ledger reading set obtained from an incoming block and related to a ledger maintained by the decentralized application. In various implementations, the local state may be compared to the transaction state. Based on the comparison of the local state and the transaction state, read set validation engine may be configured to verify whether the ledger reading set (and the transaction) is valid.

Based on the results of the signature validation by the crypto engine and the ledger reading set validation, the fixed pipeline hardware architecture may determine whether to process the transaction, commit the transaction to the blockchain, and update the verified ledger. Regardless of the results of the ledger reading set validation and the results of the signature validation or the comparison thereof, the transaction is committed (or written) to the blockchain. However, based on the comparison of the results of the ledger reading set validation and the results of the signature validation, the fixed pipeline hardware architecture may also write the transaction to a state cache and update the global state based on the transaction. Specifically, if both the ledger reading set and the cryptographic signatures are valid, the fixed pipeline hardware architecture will cause the transaction to be written to a state cache and update the global state based on the transaction. If either the ledger reading set or the cryptographic signatures are invalid, the fixed pipeline hardware architecture is specifically configured to not update the global state based on the transaction.

These and other objects, features, and characteristics of the system and/or method disclosed herein, as well as the methods of operation and functions of the related elements of structure and the combination thereof, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION OF THE INVENTION

The systems and methods described herein related to a fixed pipeline hardware architecture configured to process transaction verification operations in decentralized applications. The fixed pipeline hardware architecture may include and/or support at least a crypto engine and a read set validation engine. The crypto engine may itself comprise a hardware architecture configured to perform cryptographic operations necessary to validate signatures for transactions in decentralized applications. In various implementations, the hardware architecture of a crypto engine may include a scheduler and a series of crypto execution units configured to operate in parallel. The read set validation engine may be configured to verify whether a transaction is valid based on a comparison of an incoming transaction state indicating transaction data for the transaction and a local state related to the transaction.

Figure 1:
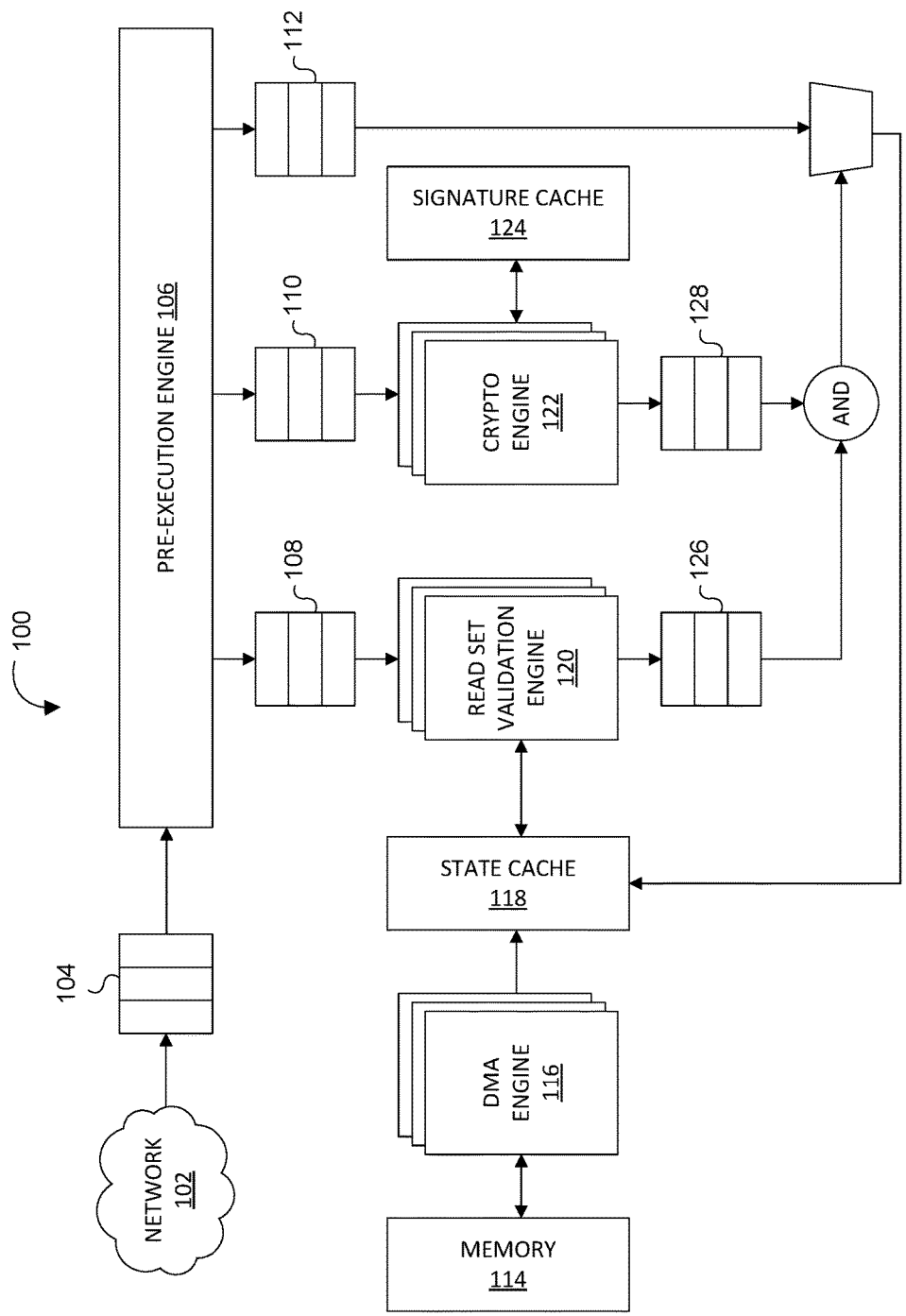
FIG. 1 depicts a block diagram of an example of a system configured to process transaction verification operations in decentralized applications, in accordance with one or more implementations of the invention.

It will be appreciated by those having skill in the art that the implementations described herein may be practiced without these specific details or with an equivalent arrangement. In other instances, well-known structures and devices are shown in block diagram form in order to avoid unnecessarily obscuring the implementations of the invention.
Exemplary System Architecture FIG. 1 depicts a block diagram of an example of a system 100 configured to process transaction verification operations in decentralized applications, in accordance with one or more implementations of the invention. In various implementations, system 100 may comprise a hardware device. In some implementations, system 100 may comprise a single self-contained hardware device configured to be communicatively coupled or physically attached to a component of a computer system. In an exemplary implementation, system 100 may comprise electronic circuitry and/or a printed circuit board that can be inserted into an electrical connector or expansion slot of a computer system. For example, system 100 may comprise an expansion card, expansion board, adapter card, or accessory card configured to accelerate the transaction verification process. In some implementations, system 100 may comprise an application specific integrated circuit (ASIC) or a field-programmable gate array (FPGA) configured to perform transaction verification operations associated with one or more decentralized applications.

System 100 may include one or more hardware components. In various implementations, the one or more hardware components of system 100 may include an incoming block buffer 104, a pre-execution engine 106, a read set holding buffer 108, a signature validation buffer 110, a write set holding buffer 112, local memory 114, a DMA engine 116, a state cache 118, a read set validation engine 120, a crypto engine 122, a signature cache 124, a read set validation result buffer 126, a signature validation result buffer 128, and/or other components. In various implementations, the one or more hardware components of system 100 may form a fixed pipeline hardware architecture configured to accelerate the transaction verification process. For example, the one or more hardware components may configure system 100 to verify the authenticity of transactions in a block, check the validity of the transactions, and/or commit (or write) the block and the validation results onto the blockchain.

System 100 may be configured to accelerate the verification of transactions received via network 102. System 100 may be configured to receive a block comprising a set of transactions via network 102. In various implementations, incoming block buffer 104 may be configured to cache the received block. In some implementations, incoming block buffer 104 may be configured to cache the received block prior to pre-execution of the received block.

In various implementations, system 100 may include a pre-execution engine 106. Pre-execution engine 106 may be configured to conduct pre-execution of new transactions while a new block is being created. By pre-executing the transaction validations, pre-execution engine 106 may significantly reduce the latency of a transaction's life cycle and greatly improve the throughput of a computer system to which system 100 is communicatively coupled and/or physically attached.

Blocks received and cached in incoming block buffer 104 may be inserted into one of a set of queues. A block comprising a set of transactions may include a ledger reading set, cryptographic signatures to be authenticated, and a ledger writing set. In various implementations, the ledger reading set of an incoming block may be inserted into read set holding buffer 108, cryptographic signatures of an incoming block to be authenticated may be inserted into signature validation buffer 110, and the ledger writing set of an incoming block may be inserted into write set holding buffer 112. In order for a transaction to be validated, both the ledger reading set and cryptographic signatures must be valid. If valid, the ledger writing set is applied to the global state (as described further herein). If not valid, the ledger writing set will not be applied to the global state. All valid information for a transaction is saved and committed (written) into the blockchain.

In various implementations, system 100 may include one or more of crypto engine 122 and read set validation engine 120. Accordingly, system 100 may include multiple crypto engines 122 and/or multiple read set validation engines 120. In some implementations, system 100 may include multiple crypto engines 122 and/or multiple read set validation engines 120 based on performance tradeoffs, cost tradeoffs, and/or power tradeoffs. As such, system 100 may be configurable based on the number of crypto engines 122 and/or read set validation engines 120 contained therein.

Each crypto engine 122 may comprise one or more cryptographic functional units configured to perform one or more cryptographic operations required to verify the authenticity of transactions in a block. For example, the one or more cryptographic operations may comprise crypto signature generation (encrypt) operations and crypto signature verification (decrypt) operations. In various implementations, crypto engine 122 may be configured to receive cryptographic signatures of a block to be authenticated from signature validation buffer 110. Crypto engine 122 may be configured to interface with signature cache 124 to obtain and cache data required to authenticate cryptographic signatures associated with a transaction. In various implementations, the results of the signature validation by crypto engine 122 may be cached in signature validation result buffer 128 at least until they are compared to results of the read set validation by read set validation engine 120. Crypto engine 122 is further described herein in connection with FIG. 2.

Each read set validation engine 120 may be configured to fetch ledger data and validate the ledger reading set against the global state. The global state may refer to the current status related to one or more data points in a verified ledger written to the blockchain. In various implementations, read set validation engine 120 may be configured to receive the ledger reading set of an incoming block from read set holding buffer 108. Read set validation engine 120 may be configured to interface with state cache 118 to obtain and cache data required to validate ledger reading set against the global state. In various implementations, the results of the ledger reading set validation by read set validation engine 120 may be cached in read set validation result buffer 126 at least until they are compared to results of the signature validation by crypto engine 122. Read set validation engine 120 is further described herein in connection with FIG. 3.

In various implementations, system 100 may comprise a direct memory access (DMA) engine 116. DMA engine 116 may be configured to fetch data required to verify the authenticity and read set data of a transaction. For example, DMA engine 116 may be configured to fetch existing blocks and signatures accessed by a transaction. In various implementations, DMA engine 116 may be configured to access a ledger in memory required to validate data associated with a transaction. For example, DMA engine 116 may be configured to access local memory 114 to obtain a ledger required to validate data associated with a transaction.

In various implementations, read set validation result buffer 126 may comprise a cache of results of the ledger reading set validation by read set validation engine 120 and signature validation result buffer 128 may comprise a cache of the results of the signature validation by crypto engine 122.

In various implementations, system 100 may be configured to compare the results of the ledger reading set validation cached in read set validation result buffer 126 and the results of the signature validation cached in signature validation result buffer 128. Regardless of the results of the ledger reading set validation and the results of the signature validation or the comparison thereof, system 100 is configured to commit (or write) the transaction to the blockchain. However, based on the comparison of the results of the ledger reading set validation and the results of the signature validation, system 100 may also write the transaction to the state cache and update the global state based on the transaction. Specifically, if both the ledger reading set and the cryptographic signatures are valid, system 100 may be configured to write the transaction to the state cache and update the global state based on the transaction. In order to update the global state based on the transaction, the ledger writing set is applied to the global state. For example, if system 100 determines that both the ledger reading set and the cryptographic signatures are valid for a given transaction, a ledger writing set associated with that transaction cached in write set holding buffer 112 may be applied to the global state to update the global state based on the transaction. If either the ledger reading set or the cryptographic signatures are invalid, system 100 is specifically configured to not update the global state based on the transaction. If the ledger reading set is not valid, it may be due to the fact that there are insufficient funds to process the transaction or that the ledger reading set otherwise indicates that one or more conditions associated with the transaction have not been satisfied. Accordingly, system 100 will not process the transaction by updating the global state. Similarly, if the cryptographic signatures are invalid, it may be indicate a potential hack has occurred. Accordingly, system 100 will not process the potentially fraudulent transaction by updating the global state.

Cryptographic Signature Validation

Figure 2:
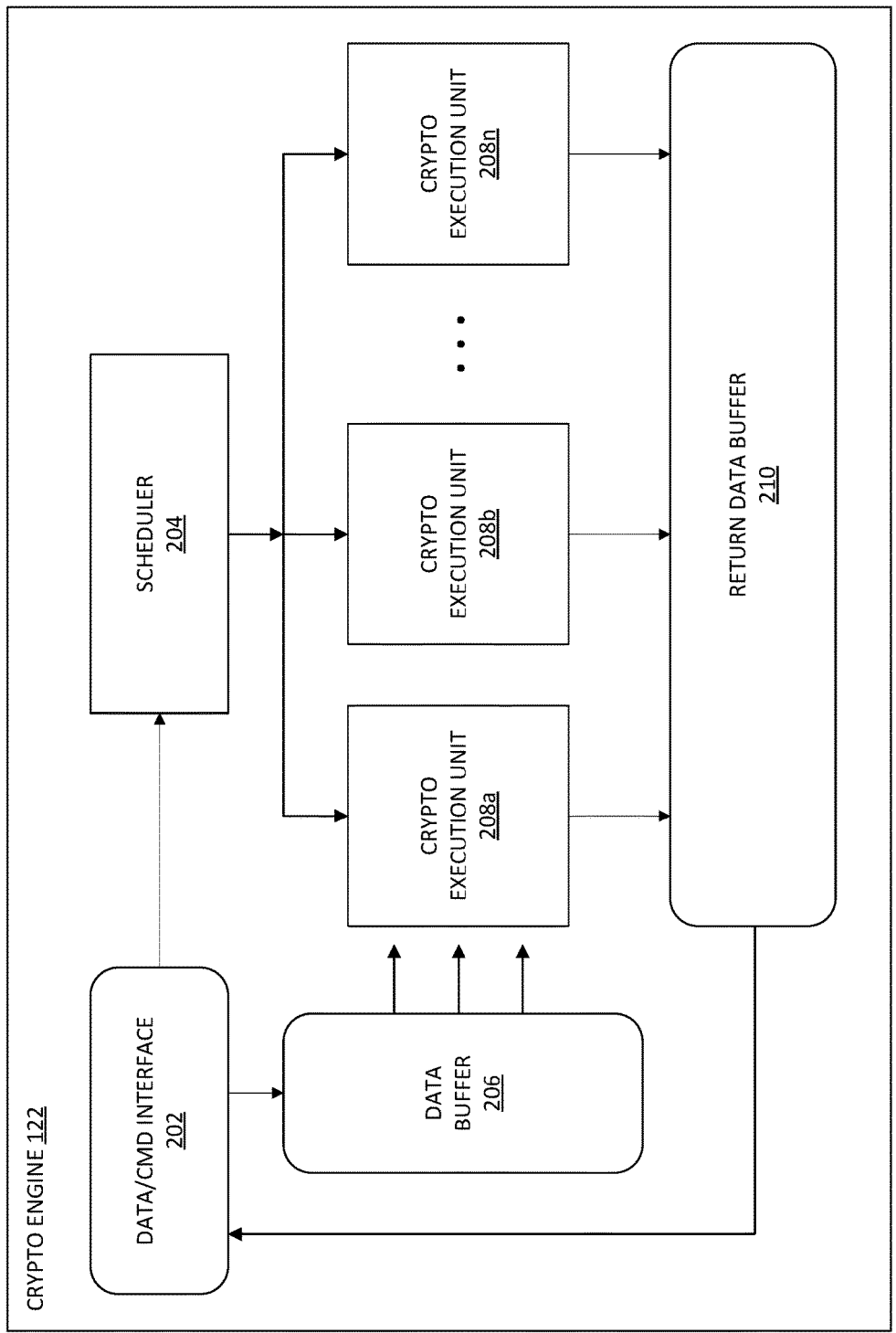
FIG. 2 illustrates a block diagram of an example of a crypto engine configured to perform one or more cryptographic operations required to verify the authenticity of transactions in a block, in accordance with one or more implementations of the invention

FIG. 2 illustrates a block diagram of an example of crypto engine 122 configured to perform one or more cryptographic operations required to verify the authenticity of transactions in a block, in accordance with one or more implementations of the invention. Crypto engine 122 may comprise an architecture configured to perform necessary cryptographic operations. In various implementations, one or more hardware components of crypto engine 122 may form a fixed pipeline hardware architecture configured to perform necessary cryptographic operations. In various implementations, the one or more hardware components of crypto engine 122 may include a data/CMD interface 202, a scheduler 204, a data buffer 206, one or more crypto execution units 208 (208*a*, 208*b*, . . . 208*n*), a return data buffer 210, and/or one or more other components. In various implementations, multiple crypto execution units 208 may be configured to operate in parallel. Accordingly, the multiple crypto execution units 208 may comprise a parallel cryptographic execution array. Crypto execution units 208 are also referred to herein as cryptographic execution units.

In various implementations, data required by one or more crypto execution units 208 may be obtained via data buffer 206. Data buffer 206 may be configured to cache data required to perform cryptographic operations related to authenticate cryptographic signatures for a block comprising a set of transactions. For example, data buffer 206 may be configured to cache algorithm parameters required to verify a cryptographic signature, hash values (e.g., hash public key and hash private key), and other data written to a block comprising a set of transactions crypto engine 122 is tasked to verify. In various implementations, data buffer 206 may be configured to provide parameters to scheduler 204 to enable scheduler 204 to determine the type of algorithm required to authenticate a cryptographic signature, but withhold hash values that are much larger in size and are not required by scheduler 204 to make the foregoing determination. Data buffer 206 may obtain data via data/CMD interface 202. Data/CMD interface 202 may comprise a high-speed and/or high-bandwidth interface. For example, data/CMD interface 202 may comprise a PCIe electrical interface or an Ethernet networking interface.

In various implementations, scheduler 204 may be configured to identify the cryptographic operations required to authenticate one or more cryptographic signatures and dispatch tasks related to the cryptographic signatures to at least one of the one or more crypto execution units 208. Each cryptographic operation may require a specific algorithm. For example, the cryptographic operation may require the elliptic curve digital signature algorithm (ECDSA), the ECDH algorithm, the RSA algorithm, the ASE algorithm, the zk-SNARKs algorithms, and/or one or more other specific algorithms. Each algorithm may have different priorities and/or parameters. In various implementations, scheduler 204 may be configured to identify the algorithmic parameters associated with one or more cryptographic signatures. In various implementations, scheduler 204 may be configured to determine the type of algorithm required to authenticate a cryptographic signature and the relevant parameters, and dispatch the cryptographic signature to one of the one or more crypto execution units 208 based on the determination. In some implementations, cryptographic signatures may be dispatched by scheduler 204 to only a subset of the one or more crypto execution units 208. As such, one or more of a set of crypto execution units 208 may be idle at a given time while other crypto execution units 208 are performing cryptographic operations. In some implementations, scheduler 204 may be configured to access information indicating the capabilities and status of each of one or more one or more crypto execution units 208. Based on the status of the one or more crypto execution units 208, scheduler 204 may be configured to load balance the cryptographic operations assigned to the one or more crypto execution units 208.

Each of the one or more crypto execution units 208 may be associated with one or more cryptographic operations or one or more types of cryptographic operations. In other words, the one or more crypto execution units 208 may be configurable for different decentralized applications. For example, crypto execution unit 208a may be configured to perform a first cryptographic operation and crypto execution unit 208b may be configured to perform a second cryptographic operation. Accordingly, when operating in parallel, different cryptographic operations may performed simultaneously by different crypto execution units 208 configured to perform specific cryptographic operations.

In various implementations, each result of cryptographic operations performed by one of the one or more crypto execution units 208 may be temporarily stored in return data buffer 210. The time required to perform different cryptographic operations may vary. Accordingly, crypto execution units 208 may require different amounts of time to perform their assigned cryptographic operation. As such, in some implementations, the results from the cryptographic operations performed for a given block or set of transactions may be provided by crypto execution units 208 at different times. Accordingly, return data buffer 210 may be configured to temporarily store the results of cryptographic operations performed by crypto execution units 208 and reorder the results before the results are cached in signature validation result buffer 128.

Read Set Validation

Figure 3:
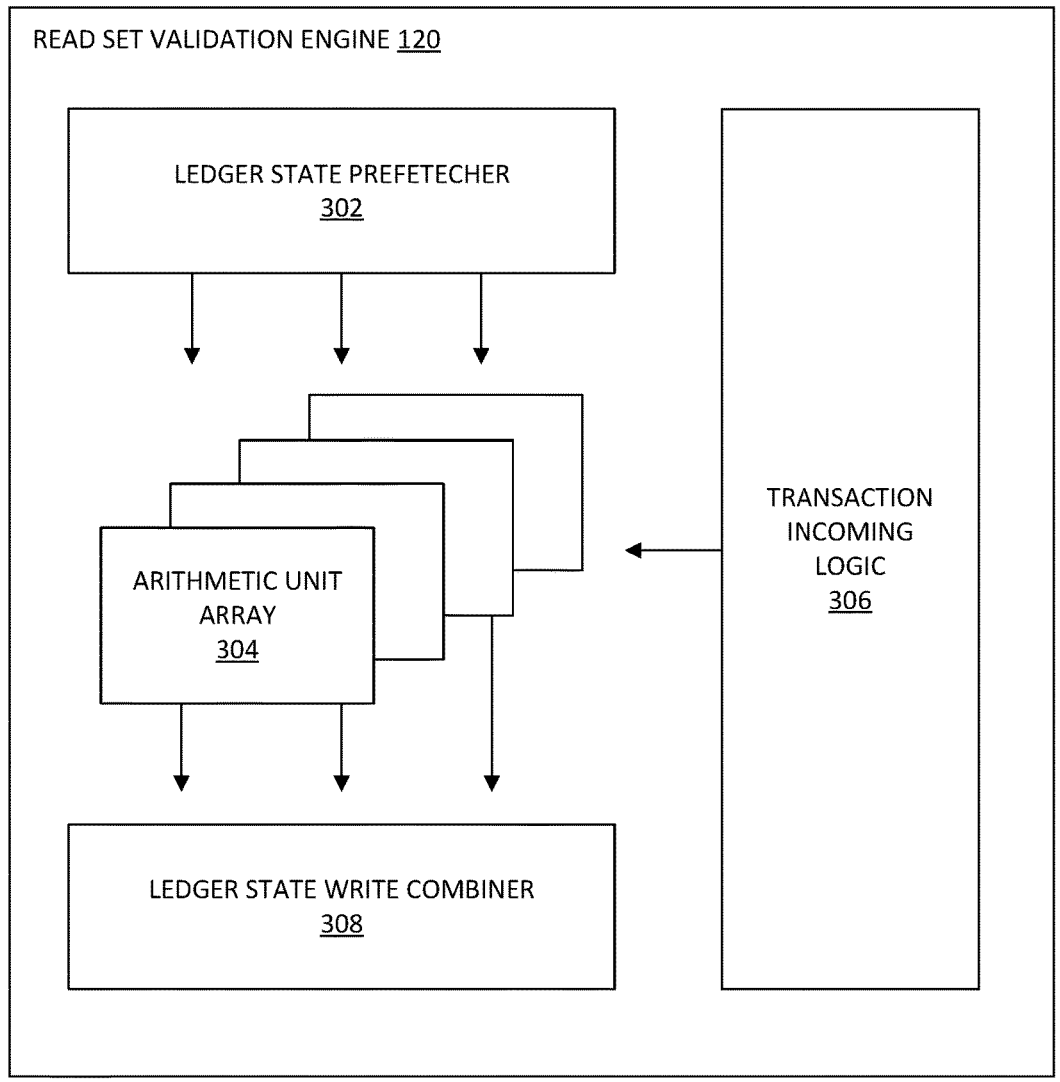
FIG. 3 illustrates a block diagram of an example of a read set validation engine configured to fetch ledger data and validate the ledger reading set against the global state, in accordance with one or more implementations of the invention

FIG. 3 illustrates a block diagram of an example of read set validation engine 120 configured to fetch ledger data and validate the ledger reading set against the global state, in accordance with one or more implementations of the invention. Read set validation engine 120 may comprise an architecture configured to validate read set data by determining whether a global state satisfies the current requirements of a transaction. In various implementations, one or more hardware components of read set validation engine 120 may form a fixed pipeline hardware architecture configured to fetch ledger data and validate the ledger reading set against the global state for a given transaction. In various implementations, the one or more hardware components of read set validation engine 120 may include a ledger state prefetcher 302, an arithmetic unit array 304, transaction incoming logic 306, a ledger state write combiner 308, and/or one or more other components. Read set validation engine 120 may be configured to obtain data necessary to validate the ledger reading set against the global state from local memory (such as memory 114 and/or state cache 118). In various implementations, read set validation engine 120 may include an input interface from DMA. For example, read set validation engine 120 may include an input interface from DMA engine 116.

In various implementations, read set validation engine 120 may comprise a ledger state prefetcher 302 configured to fetch data required by read set validation engine 120. In some implementations, ledger state prefetcher 302 may be configured to fetch a ledger state from state cache 118. In some implementations, ledger state prefetcher 302 may be configured to fetch a ledger state from state cache 118 via a high-speed memory interface. In some implementations, ledger state prefetcher 302 may be configured to prefetch a ledger state from state cache 118. Fetching from local memory would require accessing the entire memory, which would slow down throughput speed in the read set validation engine. Prefetching the ledger state from state cache 118 (which is local memory) would provide read set validation engine 120 with data from local memory without having to access the entire local memory for each computation. In various implementations, read set validation engine 120 may include transaction incoming logic 306 configured to extract state information from an incoming transaction. Accordingly, ledger state prefetcher 302 may be configured to obtain a local state from memory and transaction incoming logic 306 may be configured to obtain an incoming transaction state from the transaction data.

In various implementations, read set validation engine 120 may include arithmetic unit array 304 configured to perform a read set comparison against pre-executed results. In various implementations, arithmetic unit array 304 may be configured to perform computing tasks to verify transactions. In some implementations, arithmetic unit array 304 may be configured to operate in parallel. In other words, arithmetic unit array 304 may be configured to perform parallel processing of validation compute tasks for different transactions simultaneously. In various implementations, arithmetic unit array 304 may be configured to verify that a local copy of a state (obtained from memory) and the incoming transaction state match.

In various implementations, read set validation engine 120 may include ledger state write combiner 308 configured to perform a burst write for transaction results to the resulting buffer (i.e., read set validation result buffer 126). If an incoming transaction is validated (if the local copy of a state and the incoming transaction state match), ledger state write combiner 308 may be configured to combine states together and write to read set validation result buffer 126.

In an exemplary implementation in which a decentralized application involves a banking institution, each of the bank customers with an account may have their account written to a blockchain. Accordingly, the current status of each account and a history of every transaction involving each account is written to the blockchain, and the current status of each account would comprise the global state. In this exemplary implementation, system 100 may be configured to verify a block comprising a set of transactions involving bank customers. Transaction incoming logic 306 may be configured to obtain an incoming transaction state from the transaction data. For example, transaction incoming logic 306 may be configured to determine that a transaction involving a first bank customer involves a stock purchase for $3,000 and a transaction involving a second bank customer involves a transfer of $4,000. Read set validation engine 120 may be configured to obtain from memory (e.g., memory 114) a local state. The local state may comprise the global state indicating that a current account of the first customer comprises $2,000 and that a current account of the second customer comprises $8,000. Read set validation engine 120 may be configured to determine whether the current state meets the requirements for a given transaction. For example, arithmetic unit array 304 may be configured to compare the local state of the first customer (i.e., $2,000) and the incoming transaction state for the transaction involving the first customer (i.e., a transaction requiring $3,000), and compare the local state of the second customer (i.e., $8,000) and the incoming transaction state for the transaction involving the second customer ($4,000). Accordingly, read set validation engine 120 may be configured to determine that the transaction involving the first bank customer is invalid and that the transaction involving the second bank customer is valid.

In various implementations, the results of the ledger reading set validation by read set validation engine 120 may be cached in read set validation result buffer 126. For example, an indication that the transaction involving the first customer is invalid and an indication that the transaction involving the second customer is valid may be cached in read set validation result buffer 126. In various implementations, the results of the ledger reading set validation (i.e., the indication that the transaction involving the first customer is invalid and the indication that the transaction involving the second customer is valid) may be cached in read set validation result buffer 126 at least until they are compared to the results of the signature validation by crypto engine 122.

Exemplary Flowcharts of Processes

Figure 4:
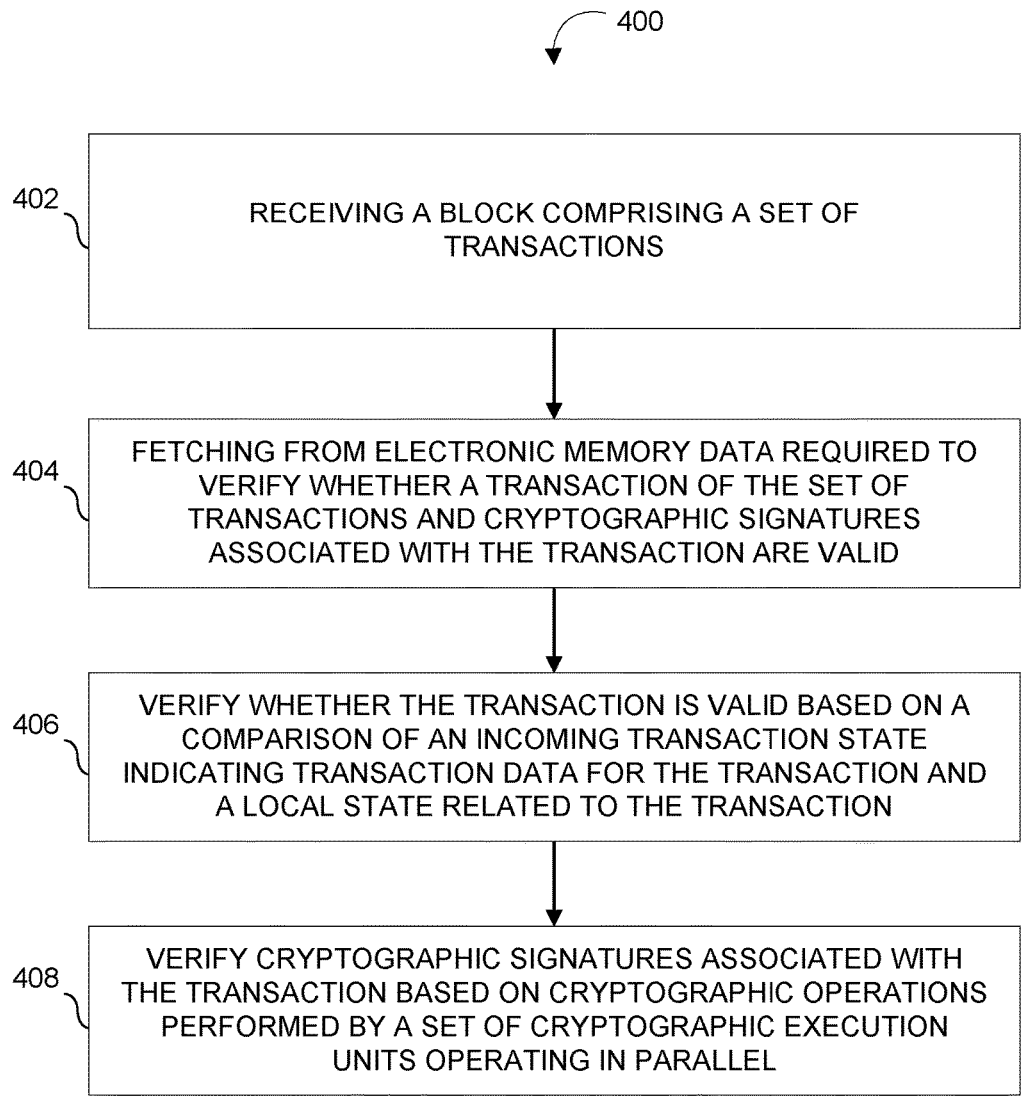
FIG. 4 depicts a flowchart of an example of a method for processing transaction verification operations in decentralized applications via a fixed pipeline hardware architecture, in accordance with one or more implementations of the invention.

FIG. 4 illustrates a method 400 for processing transaction verification operations in a decentralized application via a fixed pipeline hardware architecture, in accordance with one or more implementations of the invention. The operations of method 400 presented below are intended to be illustrative and, as such, should not be viewed as limiting. In some implementations, method 400 may be accomplished with one or more additional operations not described, and/or without one or more of the operations discussed. In some implementations, two or more of the operations may occur substantially simultaneously. The described operations may be accomplished using some or all of the system components described in detail above.

In some implementations, method 400 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operations of method 400 in response to instructions stored electronically on one or more electronic storage mediums. The one or more processing devices may include one or more devices configured through hardware, firmware, and/or software to be specifically designed for execution of one or more of the operations of method 400.

In some implementations, method 400 may be implemented via a hardware device configured to be communicatively coupled or physically attached to a component of a computer system. For example, method 400 may be implemented via the hardware device described above with respect to system 100. The hardware device described above with respect to system 100 may include one or more hardware components configured through firmware and/or software to be specifically designed for execution of one or more operations of method 400. In some implementations, method 400 may be implemented on an application specific integrated circuit (ASIC) or a field-programmable gate array (FPGA) specifically designed for execution of one or more operations of method 400.

In an operation 402, method 400 may include receiving a block comprising a set of transactions. Each block received may include a ledger reading set, cryptographic signatures to be authenticated, and/or a ledger writing set. In various implementations, the ledger reading set, cryptographic signatures, and ledger writing set may each be sorted into one or more queues. For example, in some implementations, the ledger reading set of an incoming block may be inserted into a first buffer (e.g., read set holding buffer 108), cryptographic signatures of an incoming block to be authenticated may be inserted into a second buffer (e.g., signature validation buffer 110), and the ledger writing set of an incoming block may be inserted into a third buffer (e.g., write set holding buffer 112). In some implementations, operation 402 may be performed by a hardware component the same as or similar to pre-execution engine 106 (shown in FIG. 1 and described herein).

In an operation 404, method 400 may include fetching data stored in electronic memory and required to verify whether a transaction of the set of transactions and cryptographic signatures associated with the transaction are valid. In some implementations, the data stored in electronic memory may include data indicating the local state related to the transaction. In some implementations, operation 404 may be performed by a hardware component the same as or similar to DMA engine 116 (shown in FIG. 1 and described herein).

In an operation 406, method 400 may include verifying whether the transaction is valid based on a comparison of a transaction state for the transaction and a local state related to the transaction. In some implementations, the incoming transaction state may be determined based on the cached ledger reading set. The incoming transaction state may be related to a ledger maintained by the decentralized application. In various implementations, the local state may be compared to the transaction state. Based on the comparison of the local state and the transaction state, an indication of whether the transaction is valid may be cached in a read set validation result buffer. In some implementations, operation 404 may be performed by a hardware component the same as or similar to read set validation engine 120 (shown in FIG. 1 and FIG. 3 and described herein).

In an operation 408, method 400 may include verifying cryptographic signatures associated with the transaction based on cryptographic operations performed by a set of cryptographic execution units operating in parallel. For example, the set of cryptographic execution units may perform cryptographic operations on one or more cached cryptographic signatures to verify whether the cryptographic signatures associated with the transaction are valid. In some implementations, verifying the cryptographic signatures associated with the transaction comprises identifying algorithmic parameters for the cryptographic signatures and dispatching cryptographic operations to the set of cryptographic execution units based on the identified algorithmic parameters. Each of the set of cryptographic execution units may be configured to perform one or more types of cryptographic operations. The cryptographic operations are performed to verify whether the cryptographic signatures are valid. Based on whether the cryptographic signatures are valid, an indication of whether the cryptographic signatures are valid or invalid may be cached in a signature validation result buffer. In some implementations, operation 408 may be performed by a hardware component the same as or similar to crypto engine 122 (shown in FIG. 1 and FIG. 2 and described herein).

In various implementations, method 400 may further include comparing the indication of whether the transaction is valid or invalid cached in the read set validation result buffer and the indication of whether the cryptographic signatures are valid or invalid cached in the signature validation result buffer. Responsive to a determination that at least one of the transaction or the cryptographic signatures are invalid based on the comparison, committing the transaction to the blockchain without updating the local state. Responsive to a determination that both the transaction and the cryptographic signatures are valid based on the comparison, committing the transaction to the blockchain and updating the local state based on the transaction.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer readable storage medium may include read only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

Although illustrated in FIG. 1 as a single component, system 100 may include a plurality of individual components (e.g., computer devices) each programmed with at least some of the functions described herein. In this manner, some components of system 100 may perform some functions while other components may perform other functions, as would be appreciated.

The various components illustrated in FIG. 1 may be coupled to at least one other component via a network 102, which may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. In FIG. 1, as well as in other drawing Figures, different numbers of entities than those depicted may be used. Furthermore, according to various implementations, the components described herein may be implemented in hardware and/or software that configure hardware.

For purposes of explanation, numerous specific details are set forth in order to provide a thorough understanding of the description. It will be apparent, however, to one skilled in the art that implementations of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one implementation", "an implementation", "some implementations", "various implementations", "certain implementations", "other implementations", "one series of implementations", or the like means that a particular feature, design, structure, or characteristic described in connection with the implementation is included in at least one implementation of the disclosure. The appearances of, for example, the phrase "in one implementation" or "in an implementation" in various places in the specification are not necessarily all referring to the same implementation, nor are separate or alternative implementations mutually exclusive of other implementations. Moreover, whether or not there is express reference to an "implementation" or the like, various features are described, which may be variously combined and included in some implementations, but also variously omitted in other implementations. Similarly, various features are described that may be preferences or requirements for some implementations, but not other implementations.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

The language used herein has been principally selected for readability and instructional purposes, and it may not have been selected to delineate or circumscribe the inventive subject matter. Other implementations, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A system configured to process transaction verification operations for a decentralized application via a fixed pipeline hardware architecture, wherein the system is configured to receive a block related to at least one transaction, the block including a ledger reading set and cryptographic signatures associated with the at least one transaction to be authenticated, the system comprising:
   a fixed pipeline hardware architecture comprising a set of buffers, a direct memory access, a read set validation engine, and a crypto engine;
   the set of buffers comprising at least a first buffer configured to cache the ledger reading set of the received block and a second buffer configured to cache the cryptographic signatures of the received block;
   the direct memory access configured to fetch data stored in electronic memory and required to verify whether the transaction and the cryptographic signatures associated with the transaction are valid, wherein the transaction comprises the at least one transaction, and wherein the fetched data includes a local state related to the transaction;
   the read set validation engine configured to obtain the cached ledger reading set from the first buffer, determine a transaction state for the transaction based on the cached ledger reading set, obtain the fetched data via the direct memory access indicating the local state related to the transaction, compare the local state and the transaction state, and verify whether the transaction is valid based on the comparison, wherein the transaction is valid when the local state and the transaction state match; and
   the crypto engine configured to obtain the cached cryptographic signatures from the second buffer and perform cryptographic operations necessary to verify the cached cryptographic signatures associated with the transaction, the crypto engine comprising a set of cryptographic execution units operating in parallel, wherein each of the set of cryptographic execution units is configured to perform one or more types of cryptographic operations on the cached cryptographic signatures.

2. The system of claim 1, wherein the read set validation engine is configured to determine the transaction state based on the cached ledger reading set, wherein the transaction state is related to a ledger maintained by the decentralized application, and wherein an indication of whether the transaction is valid or invalid based on the comparison is cached in a read set validation result buffer.

3. The system of claim 2, wherein the crypto engine is further configured to:
   verify whether the cryptographic signatures are valid based on cryptographic operations performed by the set of cryptographic execution units on the cached cryptographic signatures, wherein an indication of whether the cryptographic signatures are valid or invalid is cached in a signature validation result buffer.

4. The system of claim 3, wherein the system is further configured to:
   compare the indication of whether the transaction is valid or invalid cached in the read set validation result buffer and the indication of whether the cryptographic signatures are valid or invalid cached in the signature validation result buffer; and
   responsive to a determination that at least one of the transaction or the cryptographic signatures are invalid based on the comparison, commit the transaction to the blockchain without updating the local state.

5. The system of claim 3, wherein the system is further configured to:
   compare the indication of whether the transaction is valid or invalid cached in the read set validation result buffer and the indication of whether the cryptographic signatures are valid or invalid cached in the signature validation result buffer; and
   responsive to a determination that both the transaction and the cryptographic signatures are valid based on the comparison, commit the transaction to the blockchain and update the local state based on the transaction.

6. The system of claim 1, wherein the crypto engine further comprises a scheduler configured to:
   identify algorithmic parameters for the cryptographic signatures; and
   dispatch cryptographic operations to the set of cryptographic execution units based on the identified algorithmic parameters, wherein the cryptographic operations verify whether the cryptographic signatures are valid.

7. The system of claim 1, wherein the system comprises an application specific integrated circuit (ASIC) or a field-programmable gate array (FPGA).

8. A method of processing transaction verification operations for a decentralized application, the method being implemented on a computing device comprising a fixed pipeline hardware architecture, wherein the fixed pipeline hardware architecture comprises a set of buffers, a direct memory access, a read set validation engine, and a crypto engine, the method comprising:
   receiving, via the fixed pipeline hardware architecture, a block related to at least one transaction, the block including a ledger reading set and cryptographic signatures associated with the at least one transaction to be authenticated;
   caching the ledger reading set of the received block in a first buffer of the set of buffers and the cryptographic signatures of the received block in a second buffer of the set of buffers;
   fetching, by the direct memory access, data stored in electronic memory and required to verify whether the transaction and cryptographic signatures associated with the transaction are valid, wherein the transaction comprises the at least one transaction, and wherein the fetched data includes a local state related to the transaction;

obtaining, by the read set validation engine, the cached ledger reading set from the first buffer;

determining, by the read set validation engine, a transaction state for the transaction based on the cached ledger reading set;

obtaining, by the read set validation engine, the fetched data via the direct memory access indicating the local state related to the transaction;

comparing, by the read set validation engine, the local state and the transaction state;

verifying, by the read set validation engine, whether the transaction is valid based on a comparison of a local state related to the transaction and a transaction state for the transaction determined based on the cached ledger reading set, wherein the transaction is valid when the local state and the transaction state match;

obtaining, by the crypto engine, the cached cryptographic signatures from the second buffer; and verifying, by the crypto engine, the cached cryptographic signatures associated with the transaction based on cryptographic operations performed on the cached cryptographic signatures by a set of cryptographic execution units operating in parallel, wherein each of the set of cryptographic execution units is configured to perform one or more types of cryptographic operations on the cached cryptographic signatures.

9. The method of claim 8, wherein the data stored in electronic memory includes data indicating the local state related to the transaction, wherein verifying whether the transaction is valid comprises:

determining the transaction state based on the cached ledger reading set, wherein the transaction state is related to a ledger maintained by the decentralized application;

comparing the local state and the transaction state; and causing an indication of whether the transaction is valid or invalid based on the comparison to be cached in a read set validation result buffer.

10. The method of claim 9, the method further comprising:

causing an indication of whether the cryptographic signatures are valid or invalid to be cached in a signature validation result buffer.

11. The method of claim 10, the method further comprising:

comparing the indication of whether the transaction is valid or invalid cached in the read set validation result buffer and the indication of whether the cryptographic signatures are valid or invalid cached in the signature validation result buffer; and responsive to a determination that at least one of the transaction or the cryptographic signatures are invalid based on the comparison, committing the transaction to the blockchain without updating the local state.

12. The method of claim 10, the method further comprising:

comparing the indication of whether the transaction is valid or invalid cached in the read set validation result buffer and the indication of whether the cryptographic signatures are valid or invalid cached in the signature validation result buffer; and responsive to a determination that both the transaction and the cryptographic signatures are valid based on the comparison, committing the transaction to the blockchain and updating the local state based on the transaction.

13. The method of claim 8, wherein verifying the cryptographic signatures associated with the transaction comprises:

identifying algorithmic parameters for the cryptographic signatures; and dispatching cryptographic operations to the set of cryptographic execution units based on the identified algorithmic parameters, wherein the cryptographic operations verify whether the cryptographic signatures are valid.

14. The method of claim 8, wherein the method is implemented on an application specific integrated circuit (ASIC) or a field-programmable gate array (FPGA).

15. A system configured to process transaction verification operations for a decentralized application via a fixed pipeline hardware architecture, wherein the system is configured to receive a block related to at least one transaction, the block including a ledger reading set and cryptographic signatures associated with the at least one transaction to be authenticated, the system comprising:

a fixed pipeline hardware architecture comprising a direct memory access, a read set validation engine, and a crypto engine;

the direct memory access configured to fetch data stored in electronic memory and required to verify whether the transaction and cryptographic signatures associated with the transaction are valid, wherein the transaction comprises the at least one transaction, and wherein the fetched data includes a local state related to the transaction;

the read set validation engine configured to determine a transaction state for the transaction based on the ledger reading set, obtain the fetched data via the direct memory access indicating the local state related to the transaction, compare the local state and the transaction state, and verify whether the transaction is valid based on the comparison, wherein the transaction is valid when the local state and the transaction state match; and the crypto engine configured to obtain the cached cryptographic signatures from the second buffer and perform cryptographic operations necessary to verify the cached cryptographic signatures associated with the transaction, the crypto engine comprising a set of cryptographic execution units operating in parallel, wherein each of the set of cryptographic execution units is configured to perform one or more types of cryptographic operations.

16. The system of claim 15, wherein the system is configured to receive a block related to at least one transaction, the block including a ledger reading set and the cryptographic signatures associated with the transaction.

17. The system of claim 16, wherein the read set validation engine is further configured to:

determine the transaction state based on the ledger reading set, wherein the transaction state is related to a ledger maintained by the decentralized application.

18. The system of claim 16, wherein the crypto engine is further configured to:

verify whether the cryptographic signatures are valid based on cryptographic operations performed by the set of cryptographic execution units on the cryptographic signatures.

\* \* \* \* \*